(No Model.)
J. H., W. & T. D. MORRIS.
Animal Trap.
No. 235,553. Patented Dec. 14, 1880.
2 Sheets—Sheet 1.
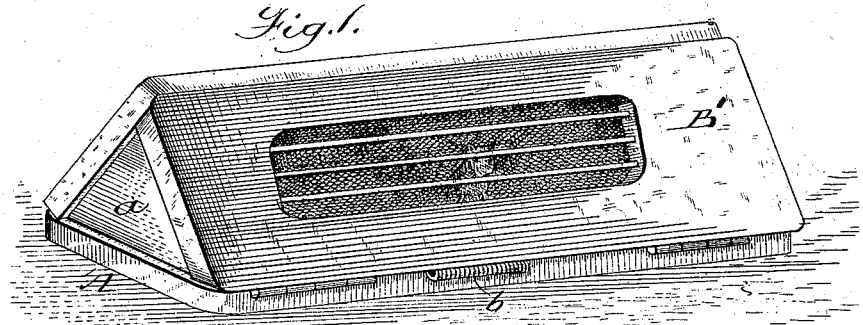
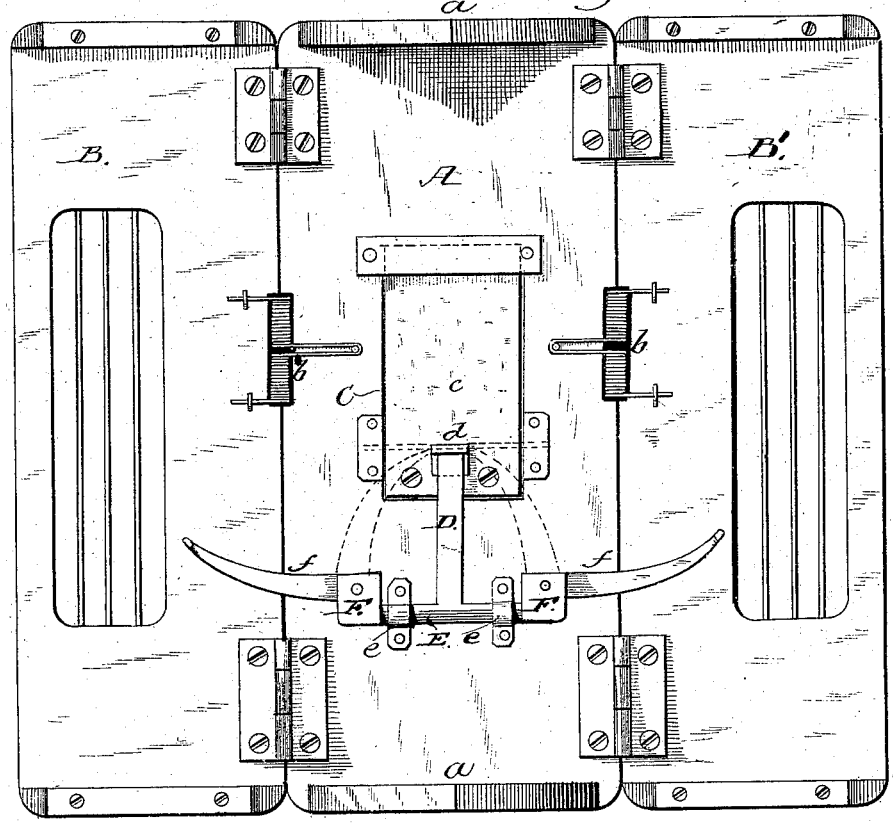

(No Model.) 2 Sheets—Sheet 2.
J. H., W. & T. D. MORRIS.
Animal Trap.
No. 235,553. Patented Dec. 14, 1880.
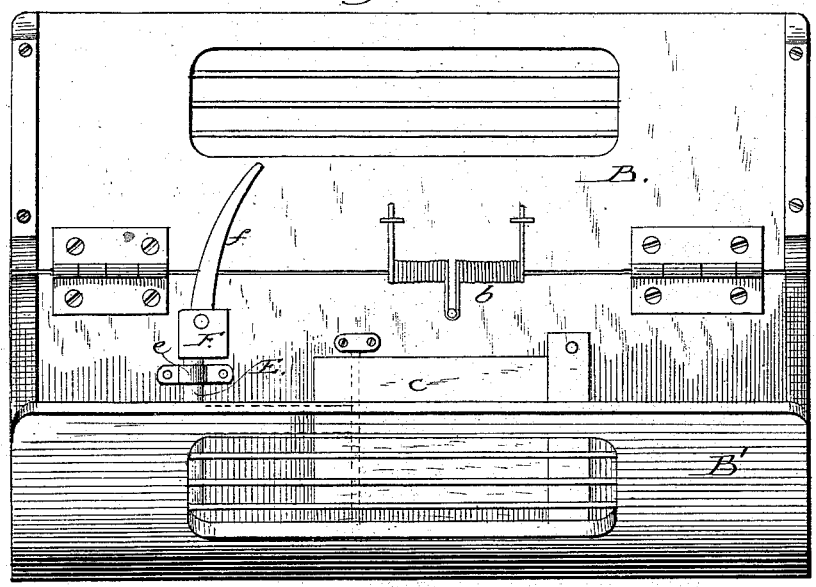
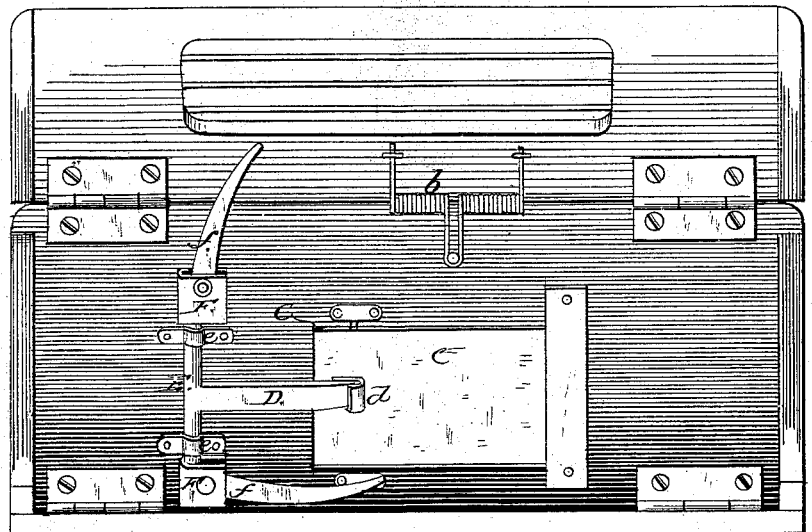
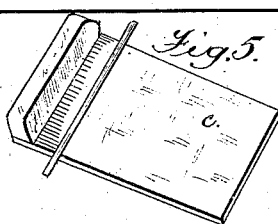

UNITED STATES PATENT OFFICE.

WILLIAM MORRIS, JOHN H. MORRIS, AND THOMAS D. MORRIS, OF SEWARD, NEBRASKA.

ANIMAL-TRAP.

SPECIFICATION forming part of Letters Patent No. 235,553, dated December 14, 1880.

Application filed May 4, 1880. (No model.)

*To all whom it may concern:*

Be it known that we, WILLIAM MORRIS, JOHN H. MORRIS, and THOMAS D. MORRIS, of Seward, county of Seward, State of Nebraska, have invented certain new and useful Improvements in Animal-Traps; and we do hereby declare the following to be a full, clear, and exact description thereof, reference being had to the accompanying drawings, making part of this specification, and in which—

Figure 1 is a perspective view of an animal-trap with our improvements attached. Fig. 2 is the trap with both wings set. Fig. 3 is the same with only one wing set. Fig. 4 shows the trap with one wing forming the bottom and the other set; Fig. 5, details referred to.

Our invention relates to that class of traps intended for the capture of animals without killing them; and it consists in the combination of devices, as hereinafter described, whereby the door of the trap may be thrown either upward, as shown in Figs. 2 and 3, or thrown downward, as shown in Fig. 4, when desired.

To enable others skilled in the art to make and use our invention, we will proceed to describe the exact manner in which we have carried it out.

In the drawings, A represents the ordinary bottom of the trap, provided with the end pieces, $a$ $a$, of a shape to accommodate the particular form of trap desired. On each side of the bottom A are hinged the sides B B', provided with the springs $b$ $b$ for throwing the wings together and closing the trap, as shown in Fig. 1, when the trap has been sprung.

Near the center of the bottom A is made an opening, C, into which is pivoted the treadle-plate $c$, on which the animal treads to spring the trap, the short end of the plate being loaded, as shown in Fig. 5, to balance the treadle-plate and thereby facilitate the setting of the trap. On this plate is secured the catch $d$, into which fits the end of the latch D, as shown in Fig. 2. This latch turns on the journal E, secured in the eyes $e$ $e$, and provided with the enlargements F, to which are loosely pivoted the bent arms $f$ $f$ on a line inside of the journal E, as shown in Fig. 2.

It is evident from this description that if the wings B B be spread and the arms $f f$ be outstretched over the wings, as shown in Fig. 2, the latch D will drop into the catch $d$ and the trap will be set with both wings spread.

On the center of the treadle-plate $c$ is placed the bait, and the animal, in approaching the bait, steps upon the treadle, which releases the catch from the latch, and the latter is thrown up by the pressure of the springs $a$ upon the arms $f$, and this allows the arms to turn upon their pivots, which releases the wings and permits them to be closed by the springs with an upward motion.

It is also evident that only one wing may be used by using only one of the arms $f$, as shown in Fig. 3, still securing the upward sweep of the wing in closing the trap.

If it be desirable to give the wing of the trap a downward motion in closing, it is only necessary to spread one wing and make the other wing the bottom of the trap for the time being, as shown in Fig. 4, and change the treadle-plate in any convenient manner, and the sweep of the wing in closing the trap will be downward.

While we have shown our trap triangular in cross-section, it may be made square by adding a top, or any other desired shape, without departing from the spirit of our invention.

Having thus described our invention, what we claim as new, and desire to secure by Letters Patent, is—

In an animal-trap, the latch D, turning on a journal, and provided with the enlargements F, in combination with the arms $f$, pivoted on a line inside the journal, whereby the journal is caused to turn when the latch is released, substantially as and for the purpose set forth.

WILLIAM MORRIS.
JOHN H. MORRIS.
THOS. D. MORRIS.

Attest:
O. T. B. WILLIAMS,
R. P. ANDERSON.